(12) United States Patent
D'Helon et al.

(10) Patent No.: US 11,501,654 B2
(45) Date of Patent: Nov. 15, 2022

(54) AUTOMATED DECISION MAKING FOR SELECTING SCAFFOLDS AFTER A PARTIALLY CORRECT ANSWER IN CONVERSATIONAL INTELLIGENT TUTOR SYSTEMS (ITS)

(71) Applicant: International Business Machines Corporation, Armonk, NY (US)

(72) Inventors: Cassius D'Helon, Coral Gables, FL (US); Vinay Kumar Reddy Kasireddy, Danbury, CT (US); Fabrizio Jose Pisciotta Sanabria, Washington, DC (US); Srijith Prabhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 16/449,415

(22) Filed: Jun. 23, 2019

(65) Prior Publication Data
US 2020/0402414 A1    Dec. 24, 2020

(51) Int. Cl.
G09B 7/02    (2006.01)
(52) U.S. Cl.
CPC ..................... *G09B 7/02* (2013.01)
(58) Field of Classification Search
CPC ...................................... G09B 7/02
USPC ....................................... 434/322
See application file for complete search history.

(56) References Cited

U.S. PATENT DOCUMENTS

| | | | |
|---|---|---|---|
| 6,634,887 | B1 | 10/2003 | Heffernan et al. |
| 8,137,112 | B2 | 3/2012 | Woolf et al. |
| 8,165,518 | B2 | 4/2012 | Smith et al. |
| 2010/0279265 | A1 | 11/2010 | Heffernan |
| 2013/0157245 | A1 | 6/2013 | Basu et al. |
| 2017/0293845 | A1* | 10/2017 | McAllister .............. H04L 47/10 |

FOREIGN PATENT DOCUMENTS

WO    WO2012112389 A1    8/2012

OTHER PUBLICATIONS

Saiying Steenbergen-Hu and Harris Cooper, Duke University, A Meta-Analysis of the Effectiveness of Intelligent Tutoring Systems on College Students' Academic Learning, Journal of Educational Psychology, 2014, vol. 106, No. 2, 331-347, published Online First Dec. 23, 2013, pp. 331-347.

(Continued)

*Primary Examiner* — Thomas J Hong
(74) *Attorney, Agent, or Firm* — Joseph Petrokaitis; Otterstedt & Kammer PLLC

(57) ABSTRACT

At least one hardware processor implementing a conversational intelligent tutor system obtains, from a student, a partially correct natural language answer to a question posed by the conversational intelligent tutor system. The at least one hardware processor implementing the conversational intelligent tutor system accesses contextual knowledge related to the student. Based on the partially correct answer and the contextual knowledge, the at least one hardware processor applies at least one of a rule set and a predictive model to select at least one scaffolding option for the student. the at least one scaffolding option is caused to be displayed to the student.

19 Claims, 6 Drawing Sheets

(56) References Cited

OTHER PUBLICATIONS

A.C. Graesser, "Learning, thinking, and emoting with discourse technologies," The American Psychologist, vol. 66, No. 8, pp. 743-757, 2011 (abstract only p. 1).

IBM Press Release, IBM Watson Education and Pearson to Drive Cognitive Learning Experiences for College Students, Oct. 25, 2016, downloaded Jun. 23, 2019 from https://www-03.ibm.com/press/us/en/pressrelease/50842.wss pp. 1-4.

IBM Watson Education, Art of the possible: IBM Watson and Pearson drive cognitive learning for college students, downloaded Jun. 18, 2019 from https://www.ibm.com/watson/education/pearson pp. 1-4.

\* cited by examiner

FIG. 1

101 — What elements are found in lower concentrations in Moon rocks compared to Earth rocks?

103 — There's less iron and gold in Moon rocks.

105 — That looks partly correct, keep going. There is more you can add to your answer.

107 — I meant iron and nickel.

109 — Excellent job on this question. Lunar rocks have less iron and nickel than the Earth.

Here are the most relevant passages from your reading to help you out.

Analyzing lunar rocks

When scientists analyzed lunar rocks, they found that they were composed of much less iron and nickel than Earth. Recall that Earth's core is composed mostly of iron and nickel. The composition of lunar rocks closely resembled that of Earth's mantle. They also found that the Moon's density was the same as Earth's mantle and crust combined.

*FIG. 2*

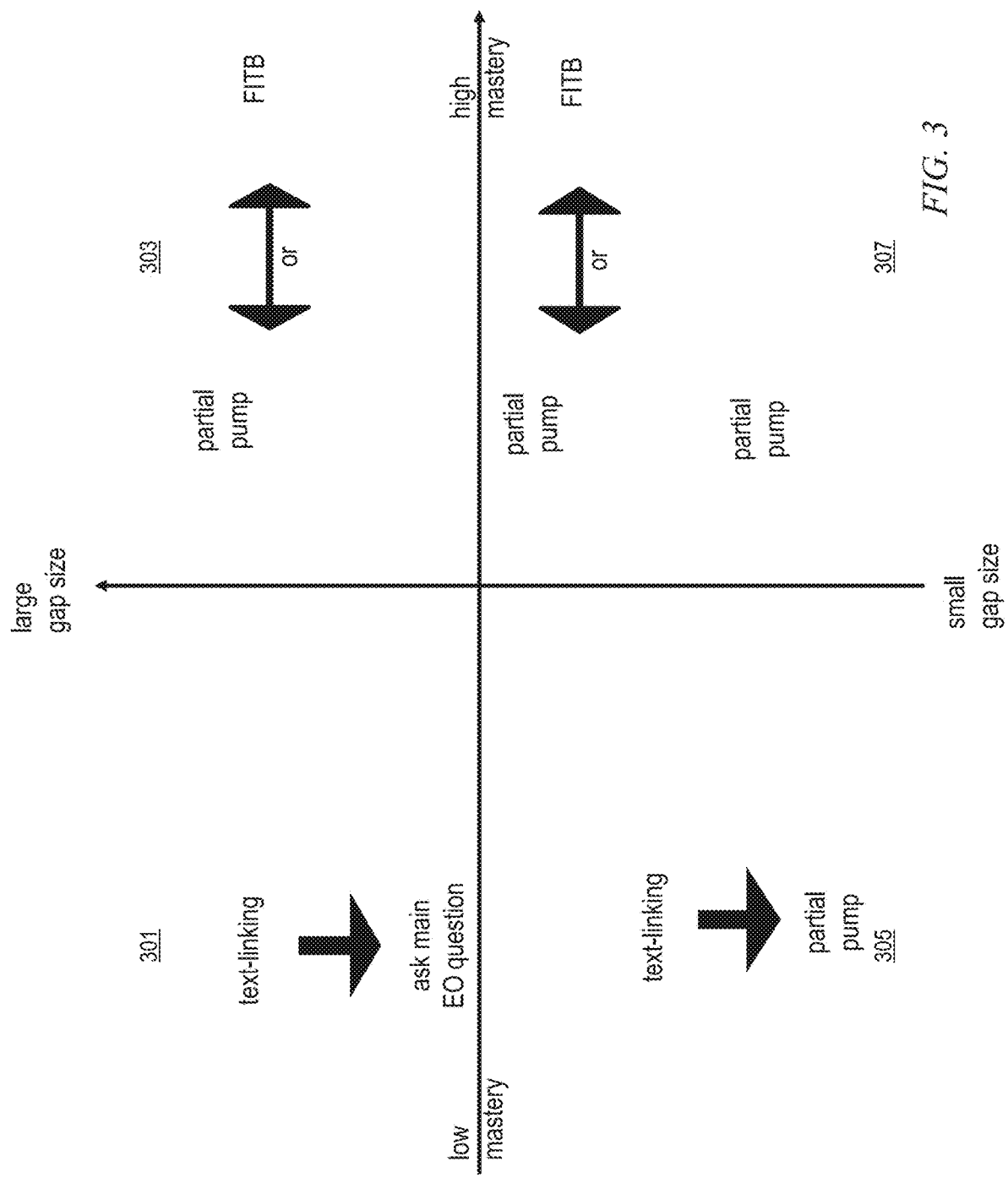

AUTOMATED DECISION MAKING FOR SELECTING SCAFFOLDS AFTER A PARTIALLY CORRECT ANSWER IN CONVERSATIONAL INTELLIGENT TUTOR SYSTEMS (ITS)

BACKGROUND

The present invention relates to the electrical, electronic and computer arts, and more specifically, to conversational intelligent tutor systems (ITS).

Conversational ITS use natural language processing to chat with students about a topic, helping the student to improve the student's mastery. A natural language answer to a question asked by an ITS can be correct, partially correct, or incorrect with respect to the reference answer. In one current ITS, 10-20% of student answers to hint questions were scored as partially correct. Partially correct answers should have some follow-up help for students, which is known as scaffolding. Treating partially correct answers in the same way as incorrect answers gives a poor learning experience. Conversational ITS need to decide what scaffolds to use after each partially correct answer, in order to assist students to improve their understanding.

SUMMARY

Principles of the invention provide techniques for automated decision making for selecting scaffolds after a partially correct answer in conversational intelligent tutor systems (ITS). In one aspect, an exemplary method includes the steps of obtaining, by at least one hardware processor implementing a conversational intelligent tutor system, from a student, a partially correct natural language answer to a question posed by the conversational intelligent tutor system; accessing, by the at least one hardware processor implementing the conversational intelligent tutor system, contextual knowledge related to the student; based on the partially correct answer and the contextual knowledge, the at least one hardware processor applying at least one of a rule set and a predictive model to select at least one scaffolding option for the student; and causing the at least one scaffolding option to be displayed to the student.

In another aspect, an exemplary apparatus includes a memory; and at least one processor, coupled to the memory, and operative to: implement a conversational intelligent tutor system which obtains, from a student, a partially correct natural language answer to a question posed by the conversational intelligent tutor system; access contextual knowledge related to the student; based on the partially correct answer and the contextual knowledge, apply at least one of a rule set and a predictive model to select at least one scaffolding option for the student; and cause the at least one scaffolding option to be displayed to the student.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

improved scaffolding in response to partially correct answers in conversational ITS;

ability to address practical limitations with each different type of scaffolding;

ability to add improved scaffolding capability to an existing conversational ITS by implementing the new functionality as a scaffold selection framework that is integrated with the existing conversational ITS and interfaces with other elements such as knowledge databases, rule sets, and/or predictive models.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 depicts an example of a partial pump as can be used in one or more embodiments of the invention;

FIG. 2 depicts an example of text-linking as can be used in one or more embodiments of the invention;

FIG. 3 depicts a scaffolding map example, according to an aspect of the invention;

DETAILED DESCRIPTION

Figure 4:
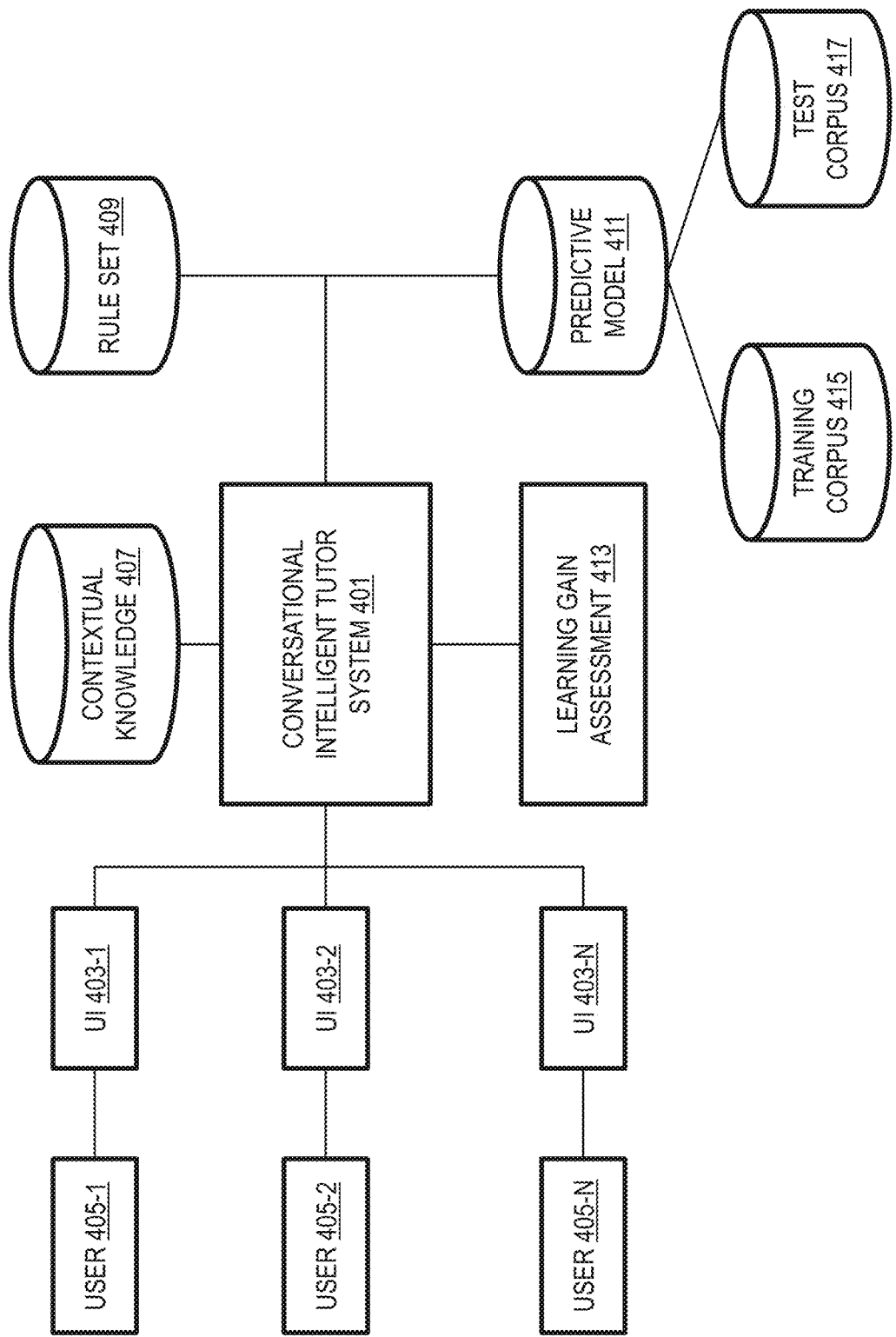
FIG. 4 depicts a block diagram of an exemplary system, according to an aspect of the invention.

A Conversational Intelligent Tutor Systems (ITS) may ask a question, a student may answer the question, and then there can be a conversation or interaction between the tutor and the student to resolve issues around a particular topic (e.g. the above-discussed "scaffolding" in the case of a partially correct answer). In current systems, there are typically a set number of questions and a set number of answers and the system tries to match the student answers to those assertions (answers). The system tries to determine whether the student is getting close to the expected answer. In principle, answers can be identified as correct, partially correct, or incorrect. One or more embodiments are useful in the case of partially correct answers—providing tutor feedback in the case of partially correct answers. In a typical but non-limiting example, 10-20% of answers may be partially correct. This will vary depending on the audience and the subject matter domain.

As noted, help provided to the student being tutored is referred to as scaffolding. One or more embodiments help the student to learn when there is a partially correct answer in a manner that is superior to simply treating the partially correct answer as an incorrect answer.

Current systems typically provide a limited set of scaffolding options. A partial pump as shown in FIG. 1 includes the tutor prompting for a second attempt at the question. Hopefully, the student expands on his or her answer and provides something that is closer to a match with the assertion for that question. In particular, in the non-limiting example of FIG. 1, at 101, the tutor asks the student "What elements are found in lower concentrations in Moon rocks compared to Earth rocks?" At 103, the student responds "There's less iron and gold in Moon rocks." At 105, the tutor prompts the student for a second attempt "That looks partly correct, keep going. There is more you can add to your answer." At 107, the student provides an additional answer "I meant iron and nickel." At 109, the tutor praises the student for the more complete answer and summarizes the model answer.

In a fill-in-the-blank approach, the tutor asks the student to fill in a missing word in the expected answer. In text-linking as shown in FIG. 2, the student is shown relevant paragraphs for the current assertion. Note the prompt at 201, and the relevant paragraph(s) at 203. In an enabling questions approach, the system continues by asking simpler or more focused questions about the topic. One or more embodiments are relevant to many different types of scaffolding.

Scaffolding can be one-step or multi-step depending on the selected type of scaffolding.

Currently, only some conversational ITS assess partially correct answers, leading to a poor learning experience. Even those conversational ITS that do assess partially correct answers rely on pedagogical models to decide what scaffolds to use after each partially correct answer. Advantageously, in contrast to the prior art, one or more embodiments take into account the student's general knowledge of the topic and the gap between the student's partially correct answer and the model answer for the current question.

Indeed, one or more embodiments select one or more scaffolding options after a partially correct answer, based on: (i) contextual knowledge that the ITS has collected about the student, for the current question asked by the ITS, as well as in the past (depending on the amount of interaction between the student and the tutor in the past), and (ii) a set of rules, or a predictive model, that specifies scaffolds and combinations thereof, taking into account any practical limitations for each type of scaffold. In one or more embodiments, both the rules and the model are improved iteratively, by evaluating the learning gains resulting from different types of scaffolds (and combinations thereof) across a student population. That is to say, a dynamic rule set or dynamic predictive model is employed in one or more embodiments, which is evidence-based (e.g. using evidence re learning gains), using some combination of scaffolding. One or more embodiments use a set of controlled experiments to work out what scaffolding options work best for a particular set of contexts, groups of students, or individual students.

Knowledge about Students

In general, this knowledge is a set of measurements collected by the ITS from analyses of the behavior and performance of students. For example, the measurements may assess the current answer gap and the student's general level of understanding. One or more embodiments consider:

the size of the gap between the student answer and the corresponding reference answer (assertion match) (as a % of the total number of tokens in the reference answer)—how close is the answer?

the mastery level of the student for the same topic—this indicates the general level of understanding (cumulative score of previous answers related to this topic) before the current answer.

the amount of time the student has spent on a topic, and the coverage of answers in the topic.

Method to Specify Scaffolds

One or more embodiments use either (i) a set of rules, such as the map in the following example, OR (ii) a machine learning model, in order to decide which scaffolding options to display to students after a partially correct answer. Learning gains can be assessed continuously by the ITS (e.g. by answer gaps), or externally by other methods, and the information gathered by correlating the gains to the scaffolds is fed back into the map or model to change it based on the evidence obtained from that group of students. Learning gains can be assessed continuously by the ITS, or externally by other methods, and the information gathered by correlating the gains to the scaffolds is fed back into the map or model. Increasing the number of scaffold options enables a more fine-grained approach, and more combinations become available.

EXAMPLE

FIG. 3 shows a scaffolding map example that relies on two inputs: measurements of the answer gap (vertical axis), and the mastery of the student (horizontal axis). Other embodiments could have more than two dimensions. The ITS uses this map to select which scaffolds to show to students after a partially correct answer. The upper left-hand quadrant 301 represents low subject-matter mastery and a large gap size between the student's answer and the correct answer for the current question; upper right-hand quadrant 303 represents high subject-matter mastery and a large gap size between the student's answer and the correct answer for the current question; the lower left-hand quadrant 305 represents low subject-matter mastery and a small gap size between the student's answer and the correct answer for the current question; and the lower right-hand quadrant 307 represents high subject-matter mastery and a small gap size between the student's answer and the correct answer for the current question. In the case of high/medium mastery (from middle to right-hand side of FIG. 3), the ITS can show either a partial pump or an FITB (fill-in-the-blank). As the gap size becomes very small (~1-2 tokens, lower part of FIG. 3), then mostly partial pumps will be shown, as it becomes unlikely that the FITB actually coincides with the gap. (If the whitelisted words for an FITB are not in the answer gap, then the tutor goes to a partial pump in one or more embodiments.) As the gap grows larger (moving up the vertical axis), the ITS is more likely to show FITB, leading to a 50/50 distribution between FITB and partial pumps. Consider a student with low mastery and a large gap size (does not understand current question and does not understand subject in general, quadrant 301). Such a student should receive significant scaffolding; for example, via text linking and/or asking the main enabling objective (EO) question (next level down in terms of granularity; as indicated by the broad arrow, could begin with text-linking and then proceed to asking the main EO question). A student in quadrant 305 may receive, for example, text linking or a partial pump.

Note that in one or more embodiments, the model answer has a plurality of keywords and a plurality of keywords are extracted from the student's answer; "tokens" or "gap tokens" refer to the keywords in the model answer that are missing from the student's answer.

Note that in quadrants 303 and 307, the double-sided arrows indicate a choice between a partial pump and a fill-in-the-blank.

One or more embodiments take an initial approach (guess), such as is depicted in FIG. 3, and then, based on the evidence from controlled experiments/conversations with a number of students, the approach is changed. For example, consider a student with high mastery and a medium gap size. In the initial approach of FIG. 3, employ a partial pump or a fill-in-the-blank (FITB). By examining learning gains, it may be determined that the fraction between partial pumps and FITBs should be changed. For example, suppose initially use 75% FITB and 25% partial pump. Observed results/experiments might suggest that for medium mastery, 50% FITB and 50% partial pump would be better (i.e. yield greater learning gains). In one or more embodiments, changes are iterative and likely to be relatively small. However, the changes may accumulate over time or diverge significantly, depending on the groups of students and the topics being covered. Each topic may have a different map.

As alluded to above, in the case of low mastery students (left-hand side of FIG. 3), the ITS aims to provide easier scaffolding and to be more selective. If the gap size is small (~1-2 tokens, lower left-hand quadrant 305 of FIG. 3), then the ITS will display a relevant paragraph (text-linking) to help the student, before giving a partial pump, as indicated by the broad arrow from "text-linking" to "partial pump." As the gap grows larger, it is likely that students with low mastery are completely lost; therefore, the ITS should provide the easiest scaffolding available, e.g., display a relevant paragraph (text-linking) and then go on to a sequence of more basic questions from an enabling objective. The scaffolding map shown in FIG. 3 represents the initial configuration. The ITS gathers information about the mastery of students as they use the scaffolding options, to evaluate their learning gains, which is then fed back to update the scaffolding map on an ongoing basis. It is also possible that additional inputs are added to the scaffolding map. The same method applies if the scaffolding map is replaced with a machine learning model that predicts which scaffolds to use for a range of inputs (features).

Features for a Machine Learning Model

If a machine learning model (e.g. predictive model 411 of FIG. 4, discussed below) is used to specify scaffolds and combinations thereof, the set of features (inputs) capturing the behavior and performance of students can include, by way of example and not limitation:

the size of the gap between the student answer and the corresponding reference answer;

the mastery level of the student for the topic;

the amount of time the student has spent on a topic;

the % of answers already covered in the topic;

the number of times the student has revisited the topic; and the number of questions the student has asked in the topic.

In one or more embodiments, the inputs to the machine learning module include the features/dimension listed above. In one or more embodiments, when a learning experiment is run, a training set (e.g. training corpus 415 discussed below) of data is employed. Consider what scaffolding options were used for each partially correct answer and which created the largest set of learning gains. Then, revisit and adjust the machine learning model by, for example, adding or subtracting one or more dimensions and/or changing the way in which scaffolding options are selected. In one or more embodiments, this is a supervised learning process using data annotated by a human expert (to reflect the best gains); the system trains on that data to improve itself. Some embodiments do not require annotations by a human expert but simply work based on the raw learning gains or other objective measure. Learning gains can be specified using any of a number of techniques known to the skilled artisan. For example, consider a standard multiple-choice test. Results on the standard multiple-choice test could be used as an objective measure of learning gain not requiring human annotation. A human would still typically write the multiple choice test in one or more embodiments.

One or more embodiments of the invention select one or more scaffolding options after a partially correct answer, based on knowledge about the student that combines: (i) the student's cumulative understanding of a topic, and (ii) the student's ability to answer the current question in the topic. In one or more embodiments, the map (rules), or predictive model, used to decide which scaffold options to display, are dynamic. Information that links the learning gains of groups of students to scaffold options is fed back to update the map or model on an ongoing basis. Regarding the dynamic aspect, the map/model will change based on the number of scaffolding options introduced, the experimental results, and so on. In some sense, many things are dynamic in the learning world; for example, a student might be learning about a topic today but in six months, the information about that topic has changed. Therefore, in at least some instances, a steady state may never be reached but the map/model may remain dynamic for most topics. On the other hand, for well-known factual topics with little new research, a steady state may be reached in time (e.g. after a few months).

One or more embodiments are useful in the field of conversational ITS; that is to say, where there is a dialog across multiple turns. One or more embodiments are concerned with partially correct answers rather than correct or incorrect answers.

One or more embodiments provide an automated decision-making method to select one or more scaffolding options after a partially correct answer in a conversational ITS, based on: a set of measurements collected by the ITS from analyses of the behavior and performance of students, for the current question asked by the ITS, as well as in the past; and a set of rules, or a predictive model, that specify scaffolds and combinations of scaffolds after each partially correct answer. In one or more embodiments, practical limitations for each type of scaffold are taken into account when selecting an option. In one or more instances, the learning gains from different types of scaffolds are evaluated (preferably but not necessarily continuously; this can also be done at regular intervals e.g. monthly) within the ITS (or externally by other methods). In one or more embodiments, the correlation of the learning gains to scaffolds or combinations thereof is then fed back on an ongoing basis to update the map or model for a group of students (e.g., students sharing similar characteristics). The learning gains can, but need not, be evaluated within the same ITS; for example, they can be evaluated externally by a multiple choice test or the like. Divergence may be noted when dealing with different topics (e.g. math versus art) and/or different groups of students.

The skilled artisan in the field of ITS knows how to determine whether something is a partially correct answer; e.g., using gap tokens. Keyword matching is common, suitable approach. Some embodiments enhance keyword matching by using word embedding to determine words that are similar to one another (e.g. synonym or word that is similar in the context of the task); both an exact match and a synonym match are scored in such instances. As used herein, a fully correct answer has 0% gap; an incorrect answer has a 100% gap (no similarity at all); and a partially correct answer is any answer that is not fully correct or incorrect; e.g., from 1% to 99% without considering decimal places.

In some embodiments, beginning with no data, use a reinforcement learning algorithm for model 411 (discussed below) and set a target on a simple indicator about student learning. No training corpus 415 or test corpus 417 (discussed below) would typically be present for the reinforcement learning algorithm. Later, as data becomes available regarding the relationship between different types of scaffolding and the student learning outcomes, one or more embodiments implement supervised learning algorithms for model 411; e.g. a Markov decision model in which many different scaffolding combinations are tried on a trial and error basis; some scaffolding options will lead to better outcomes and some to worse outcomes. This approach typically requires initial data to get started. Once sufficient data is available, a classic machine learning algorithm can be trained (e.g. a classifier) and use can be made of test and training corpora 415, 417.

Figure 5:
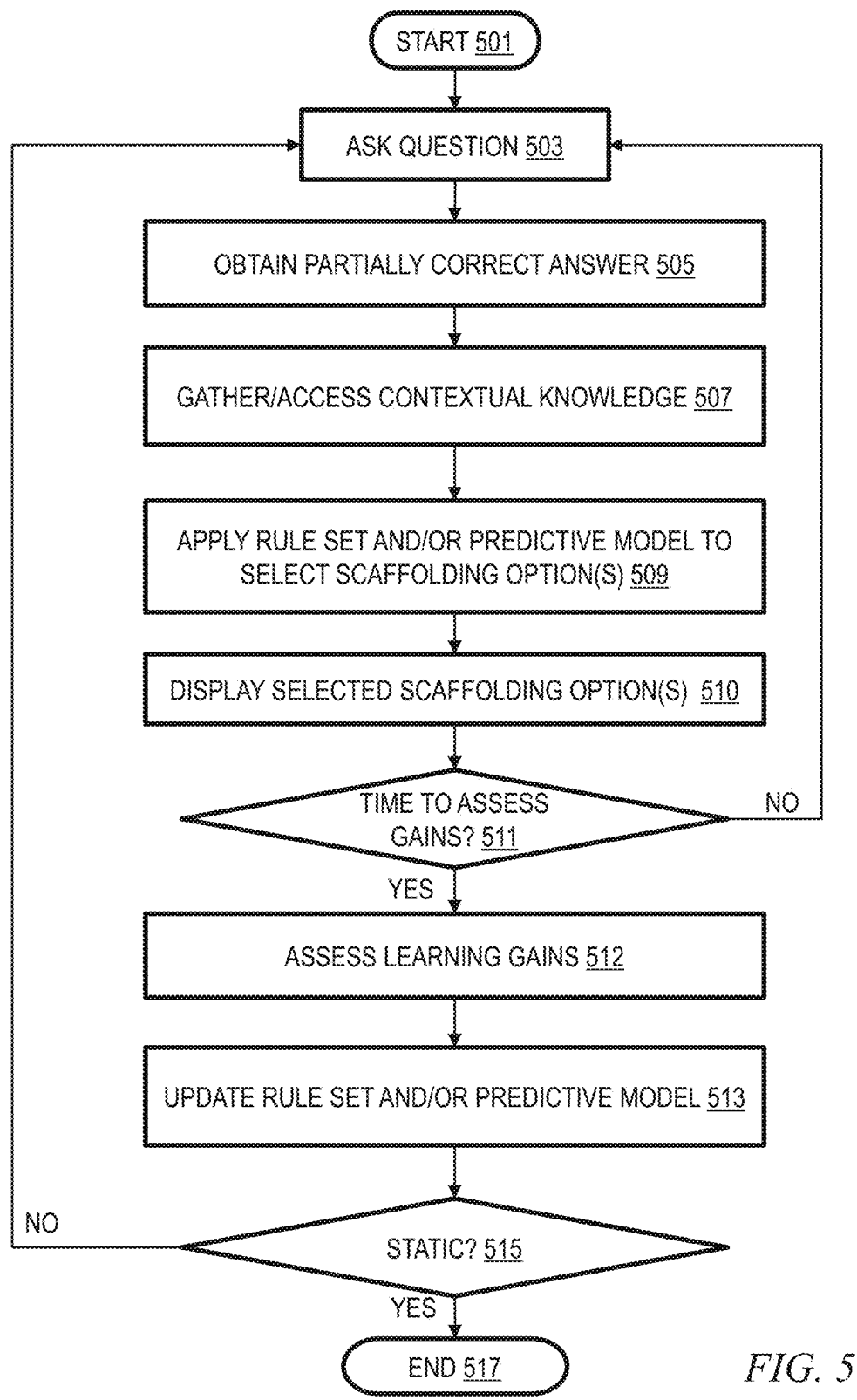
FIG. 5 depicts a flow chart of an exemplary method, according to an aspect of the invention.

Reference should now be had to the block diagram of FIG. 4 and the flow chart of FIG. 5 (which begins at 501). Given the discussion thus far, it will be appreciated that, in general terms, an exemplary method, according to an aspect of the invention, includes the step 505 of obtaining, by at least one hardware processor (e.g. processing unit 16 discussed below) implementing a conversational intelligent tutor system 401, from a student (e.g., one of the users 405-1, 405-2 . . . 405-N in FIG. 4), a partially correct natural language answer to a question posed by the conversational intelligent tutor system (e.g. in step 503). Each user can communicate with the system 401 via a suitable corresponding user interface 403-1, 403-2 . . . 403-N; optionally, the user interfaces are customized for the corresponding users. A further step 507 includes accessing, by the at least one hardware processor implementing the conversational intelligent tutor system, contextual knowledge 407 related to the student. A still further step 509 includes, based on the partially correct answer and the contextual knowledge, the at least one hardware processor applying at least one of a rule set 409 and a predictive model 411 to select at least one scaffolding option for the student. A still further step 510 includes causing the at least one scaffolding option to be displayed to the student (e.g. via the corresponding UI). The system, 401 can then be operated to continue tutoring the student in accordance with the selected scaffolding option(s).

Predictive model 411 can employ a training corpus 415 for supervised learning. A portion of the data can be held back for a test corpus 417 to check how well the model performs.

In decision block 511, determine whether it is time to assess the gains and update the rule set and/or model. This could be done continuously and block 511 could be dispensed with; however, in one or more embodiments, assessment and update 512, 513 are carried out on a batch basis every predetermined number of questions. If not time to update (NO branch of 511), return to step 503. If time to update (YES branch of 511), an additional step 513 includes the at least one hardware processor iteratively updating the at least one of a rule set and a predictive model based on evaluation of learning gains (e.g., assessed in step 512) associated with candidate scaffolds across a population of students. For example, the iterative updating can include the at least one hardware processor continuously assessing the learning gains and updating the at least one of a rule set and a predictive model. Alternatively, the iterative updating can include an external entity assessing the learning gains, or a combination of external update and continuous assessment by the system can be employed. Block 413 represents both options.

Note that the process can be continuous unless a static condition is reached, as indicated by decision block 515 with NO branch to step 503 and YES branch to terminator 517.

In some cases, the at least one hardware processor implementing the conversational intelligent tutor system gathers the contextual knowledge related to the student while the student answers the posed question and during at least one past interaction with the student (e.g. earlier questions on the same topic).

In one or more embodiments, in the applying step, the at least one scaffolding option includes a combination of scaffolds (refer to the example of FIG. 3).

In some instances, the contextual knowledge gathered by the at least one hardware processor implementing the conversational intelligent tutor system includes: size of a gap between the partially correct natural language answer and a corresponding reference answer; and a topic mastery level corresponding to the student's mastery level for a topic of the question posed by the conversational intelligent tutor system.

In some embodiments, the applying includes applying the predictive model 411; for example, a machine learning model based on features including: size of a gap between the partially correct natural language answer and a corresponding reference answer; a topic mastery level corresponding to the student's mastery level for a topic of the question posed by the conversational intelligent tutor system; an amount of time the student has spent on the topic of the question posed by the conversational intelligent tutor system; a fraction of correct answers to questions associated with the topic of the question posed by the conversational intelligent tutor system already covered and/or a fraction of incorrect answers to questions associated with the topic of the question posed by the conversational intelligent tutor system already covered; a number of times the student has revisited the topic of the question posed by the conversational intelligent tutor system; and a number of questions the student has asked in the topic of the question posed by the conversational intelligent tutor system.

Each user 405-1, 405-2 . . . 405-N can have, for example, a computing device such as system 10, discussed below, and can access tutor system 401 via a suitable user interface 403-1, 403-2 . . . 403-N as discussed elsewhere herein. Non-limiting examples of predictive model 411 including aspects of corpora 415, 417 have been discussed elsewhere herein. Rule set 409 can include, for example, rules such as those shown in FIG. 3 expressed in IF-THEN-ELSE statements in a high-level programming language and compiled into executable code. Contextual knowledge 407 refers to knowledge regarding the student; e.g., the level of mastery and the gap size, and/or other factors about the student as discussed elsewhere herein (age, history, topic-related knowledge, and the like). Element 407 can be implemented, for example, via a database system such as a relational database management system wherein knowledge about the student can be looked up based on an identifier of the student.

Learning gain assessment 413 can be internal or external; for example, periodically (weekly, monthly, or other desired interval) administer a multiple-choice question test to the students and compare before and after results to assess the effectiveness of the scaffolding. Implementation can include, for example, a custom program in a high-level language, a common statistics package together with a database program, a computing environment such as MATLAB® software available from THE MATHWORKS INC., NATICK, MASSACHUSETTS USA, and the like, to compare the before-and-after results quantitatively or even merely qualitatively (e.g. scores up or down).

Conversational ITS 401 can be implemented, for example, by modifying a known commercially available conversational ITS ("conversational intelligent tutor package") (a non-limiting example is Watson Tutor available from International Business Machines Corporation, Armonk, N.Y., USA) in accordance with techniques disclosed herein. For example, add to the known conversational ITS a main routine/module ("scaffold selection framework") that implements the logic in the flow chart of FIG. 5 and interfaces with the other components as described herein to carry out the individual steps. This has the advantage of permitting flexibility in utilizing existing systems updated according to techniques disclosed herein.

As noted, in one or more embodiments, practical limitations for each type of scaffold are taken into account when selecting an option. As will be appreciated by the skilled artisan, each type of scaffold has potential practical limitations. For example, text linking may encounter a situation where the textbook being used does not include passages pertinent to the specific question. In such a case, even if test linking is the preferred form of scaffolding, it is not available and an alternate form of scaffolding should be recommended, for example, by the predictive model. For FITB, there is typically a missing keyword and it is desirable for the student to fill in that keyword. However, what if the keyword has already been mentioned by the student? Prompting the student for that keyword will not be a helpful strategy.

The skilled artisan will be familiar with many different types of scaffolding; an exemplary set of non-limiting examples has been discussed herein. One or more embodiments are usable with any type of scaffolding and are not limited to the particular examples of scaffolding disclosed herein.

In another aspect, a non-transitory computer readable medium includes computer executable instructions which when executed by a computer implementing a conversational intelligent tutor system cause the computer to perform or otherwise facilitate a method including any one, some, or all of the method steps herein.

Figure 6:
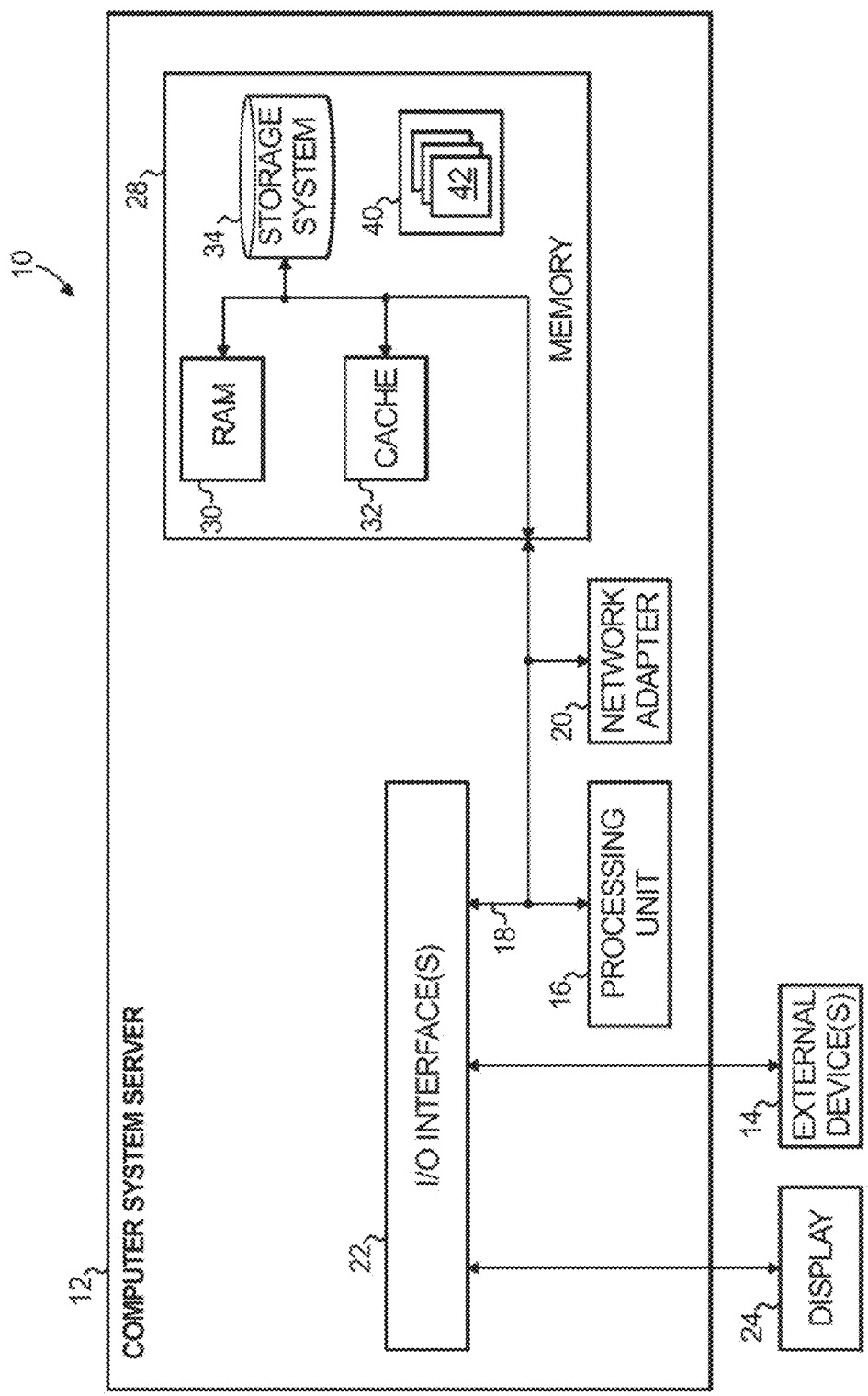
FIG. 6 depicts a computer system that may be useful in implementing one or more aspects and/or elements of the invention, also representative of a cloud computing node according to an embodiment of the present invention.

In yet another aspect, referring to FIG. 6 discussed elsewhere herein, an apparatus includes a memory 28; and at least one processor 16, coupled to the memory, and operative to: implement a conversational intelligent tutor system which obtains, from a student, a partially correct natural language answer to a question posed by the conversational intelligent tutor system; access contextual knowledge related to the student; based on the partially correct answer and the contextual knowledge, apply at least one of a rule set and a predictive model to select at least one scaffolding option for the student; and cause the at least one scaffolding option to be displayed to the student.

The at least one processor can be further operative to perform or otherwise facilitate any one, some, or all of the additional method steps herein. As noted, the conversational ITS can be implemented, for example, by adding to a conversational intelligent tutor package a scaffold selection framework as described herein.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention, it being understood that cloud, non-cloud, and mixed embodiments are possible. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

As noted, one or more embodiments can be at least partially implemented in the context of a cloud or virtual machine environment, although this is exemplary and non-limiting. System 12 can function as a cloud node 10 but can also function in a non-cloud or mixed implementation.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described.

The method steps can then be carried out using the distinct software modules and/or sub-modules of the system, as described above (e.g. in FIG. 4), executing on one or more hardware processors such as 16. Further, a computer program product can include a computer-readable storage medium with code adapted to be implemented to carry out one or more method steps described herein, including the provision of the system with the distinct software modules.

One example of user interface 403-1, 403-2 . . . 403-N that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    developing, by at least one hardware processor implementing a conversational intelligent tutor system, a machine learning model for scaffold selection by:
        without use of training data, applying a reinforcement learning model with a target set on a simple student learning indicator to obtain data regarding relationship between types of scaffolding and student learning outcomes; and
        using said data regarding relationship between types of scaffolding and student learning outcomes to train a supervised machine learning model;
    obtaining, by said at least one hardware processor implementing said conversational intelligent tutor system, from a student, a partially correct natural language answer to a question posed by said conversational intelligent tutor system;
    accessing, by said at least one hardware processor implementing said conversational intelligent tutor system, contextual knowledge related to said student, said contextual knowledge comprising size of a gap between said partially correct natural language answer and a corresponding reference answer, and a topic mastery level corresponding to said student's mastery level for a topic of said question posed by said conversational intelligent tutor system;
    based on said partially correct answer and said contextual knowledge, said at least one hardware processor applying said supervised machine learning model to select at least one scaffolding option for said student; and
    causing said at least one scaffolding option to be displayed to said student.

2. The method of claim 1, further comprising said at least one hardware processor iteratively updating said supervised machine learning model based on evaluation of learning gains associated with candidate scaffolds across a population of students.

3. The method of claim 2, wherein said iterative updating comprises said at least one hardware processor continuously assessing said learning gains and updating said supervised machine learning model.

4. The method of claim 2, wherein said iterative updating comprises an external entity assessing said learning gains.

5. The method of claim 2, further comprising said at least one hardware processor implementing said conversational intelligent tutor system gathering said contextual knowledge related to said student while said student answers said posed question and during at least one past interaction with said student.

6. The method of claim 5, wherein, in said applying step, said at least one scaffolding option comprises a combination of scaffolds.

7. The method of claim 5, wherein said applying of said supervised machine learning model comprises applying said machine learning model based on features comprising:
    said size of said gap between said partially correct natural language answer and said corresponding reference answer;
    said topic mastery level corresponding to said student's mastery level for said topic of said question posed by said conversational intelligent tutor system;
    an amount of time said student has spent on said topic of said question posed by said conversational intelligent tutor system;
    at least one of a fraction of correct answers to questions associated with said topic of said question posed by said conversational intelligent tutor system already covered and a fraction of incorrect answers to questions associated with said topic of said question posed by said conversational intelligent tutor system already covered;
    a number of times said student has revisited said topic of said question posed by said conversational intelligent tutor system; and
    a number of questions said student has asked in said topic of said question posed by said conversational intelligent tutor system.

8. The method of claim 1, further comprising said at least one hardware processor taking into account at least one practical scaffold limitation when selecting said at least one scaffolding option for said student.

9. A non-transitory computer readable medium comprising computer executable instructions which when executed by a computer implementing a conversational intelligent tutor system cause the computer to perform a method comprising:
    developing a machine learning model for scaffold selection by:
        without use of training data, applying a reinforcement learning model with a target set on a simple student learning indicator to obtain data regarding relationship between types of scaffolding and student learning outcomes; and
        using said data regarding relationship between types of scaffolding and student learning outcomes to train a supervised machine learning model;
    obtaining, from a student, a partially correct natural language answer to a question posed by said conversational intelligent tutor system;
    accessing, by said computer implementing said conversational intelligent tutor system, contextual knowledge related to said student, said contextual knowledge comprising size of a gap between said partially correct natural language answer and a corresponding reference answer, and a topic mastery level corresponding to said student's mastery level for a topic of said question posed by said conversational intelligent tutor system;
    based on said partially correct answer and said contextual knowledge, said computer applying said supervised machine learning model to select at least one scaffolding option for said student; and causing said at least one scaffolding option to be displayed to said student on a display associated with said computer.

10. The non-transitory computer readable medium of claim 9, wherein said computer executable instructions executed by said computer implementing said conversational intelligent tutor system further cause said computer to iteratively update said supervised machine learning model based on evaluation of learning gains associated with candidate scaffolds across a population of students.

11. An apparatus comprising:
a memory; and
at least one processor, coupled to said memory, and operative to:
develop a machine learning model for scaffold selection by:
without use of training data, applying a reinforcement learning model with a target set on a simple student learning indicator to obtain data regarding relationship between types of scaffolding and student learning outcomes; and
using said data regarding relationship between types of scaffolding and student learning outcomes to train a supervised machine learning model;
implement a conversational intelligent tutor system which obtains, from a student, a partially correct natural language answer to a question posed by said conversational intelligent tutor system;
access contextual knowledge related to said student, said contextual knowledge comprising size of a gap between said partially correct natural language answer and a corresponding reference answer, and a topic mastery level corresponding to said student's mastery level for a topic of said question posed by said conversational intelligent tutor system;
based on said partially correct answer and said contextual knowledge, apply said supervised machine learning model to select at least one scaffolding option for said student; and
cause said at least one scaffolding option to be displayed to said student.

12. The apparatus of claim 11, wherein said at least one processor is further operative to iteratively update said supervised machine learning model based on evaluation of learning gains associated with candidate scaffolds across a population of students.

13. The apparatus of claim 12, wherein said iterative updating comprises said at least one processor continuously assessing said learning gains and updating said supervised machine learning model.

14. The apparatus of claim 12, wherein said at least one processor is further operative to implement said conversational intelligent tutor system gathering said contextual knowledge related to said student while said student answers said posed question and during at least one past interaction with said student.

15. The apparatus of claim 14, wherein said at least one scaffolding option comprises a combination of scaffolds.

16. The apparatus of claim 14, wherein said applying of said supervised machine learning model comprises applying said machine learning model based on features comprising:
said size of said gap between said partially correct natural language answer and said corresponding reference answer;
said topic mastery level corresponding to said student's mastery level for said topic of said question posed by said conversational intelligent tutor system;
an amount of time said student has spent on said topic of said question posed by said conversational intelligent tutor system;
at least one of a fraction of correct answers to questions associated with said topic of said question posed by said conversational intelligent tutor system already covered and a fraction of in correct answers to questions associated with said topic of said question posed by said conversational intelligent tutor system already covered;
a number of times said student has revisited said topic of said question posed by said conversational intelligent tutor system; and
a number of questions said student has asked in said topic of said question posed by said conversational intelligent tutor system.

17. The apparatus of claim 14, further comprising said at least one processor taking into account at least one practical scaffold limitation when selecting said at least one scaffolding option for said student.

18. The apparatus of claim 11, wherein:
said at least one processor is operative to implement said conversational intelligent tutor system by executing a conversational intelligent tutor package and a scaffold selection framework;
said at least one processor is operative to access said contextual knowledge related to said student via said scaffold selection framework;
said at least one processor is operative to, based on said partially correct answer and said contextual knowledge, via said scaffold selection framework, apply said said supervised machine learning model to select at least one scaffolding option for said student; and
said at least one processor is operative to cause said at least one scaffolding option to be displayed to said student via said conversational intelligent tutor package.

19. The method of claim 1, further comprising said at least one hardware processor implementing said conversational intelligent tutor system determining said size of said gap between said partially correct natural language answer and said corresponding reference answer based on a number of keywords in said corresponding reference answer missing from said partially correct natural language answer.

* * * * *